United States Patent [19]
Nolan

[11] Patent Number: 5,101,744
[45] Date of Patent: Apr. 7, 1992

[54] DISPENSER FOR GRANULAR MATERIALS

[76] Inventor: John T. Nolan, 22 E. Court St., Iowa City, Iowa 52240

[21] Appl. No.: 698,277

[22] Filed: May 10, 1991

[51] Int. Cl.⁵ .............................................. A01L 5/02
[52] U.S. Cl. ........................................ 111/95; 111/92; 222/196.2; 222/500
[58] Field of Search .............. 111/95, 92, 96, 99; 222/196.1, 196.2, 500

[56] References Cited

U.S. PATENT DOCUMENTS

| | | | |
|---|---|---|---|
| 1,347,249 | 7/1920 | Gastillo | 111/99 |
| 1,891,824 | 12/1932 | Madigan | 222/196.2 |
| 2,013,440 | 9/1935 | Gessler | 222/196.2 |
| 3,184,119 | 5/1965 | Null | 222/500 |
| 3,550,542 | 12/1970 | Hollis | 111/95 |
| 3,815,526 | 6/1974 | Christopherson | 111/96 |
| 4,084,726 | 4/1978 | Nicol | 111/96 |
| 4,206,714 | 6/1980 | Walsh | 111/92 |
| 4,290,374 | 9/1981 | Maples | 222/196.2 |
| 4,760,807 | 8/1988 | Keller | 111/92 |
| 4,934,288 | 6/1990 | Kusiak et al. | 111/92 |

FOREIGN PATENT DOCUMENTS

| | | | |
|---|---|---|---|
| 66151 | of 1892 | Austria | 111/92 |
| 1055695 | 4/1902 | France | 222/500 |

Primary Examiner—Randolph A. Reese
Assistant Examiner—Spencer Warnick
Attorney, Agent, or Firm—Morton S. Adler

[57] ABSTRACT

A manual dispenser for granular materials includes a hopper operably connected to one end of an elongated tube for material flow communication. The other end of the tube is closed and a material exit opening is provided in the side of the tube near the bottom end. A freely movable closure is disposed to normally close flow communication between the hopper and the tube. A removable cap is provided for the tube. The forceful manual movement of the tube in a vertical plane to a sudden stop effects the movement of the closure to permit material flow communication between the hopper and the tube for a limited time interval after which the closure is returned to its original position by gravity. During such time interval, material from the hopper will flow by gravity into the tube for passage out of the exit opening to be deposited at any selected point or along a linear path by manipulation of the tube.

15 Claims, 2 Drawing Sheets

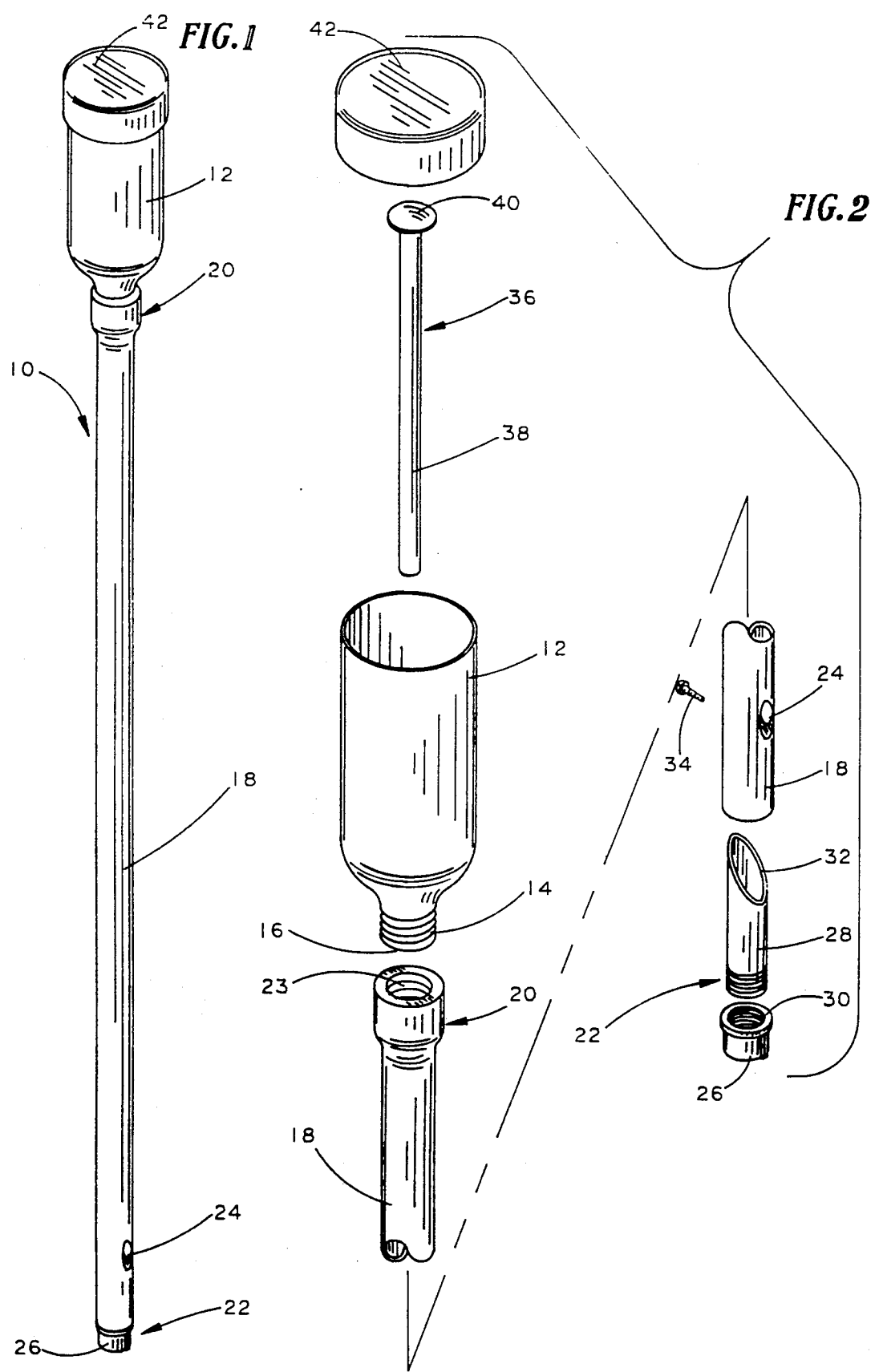

DISPENSER FOR GRANULAR MATERIALS

BACKGROUND OF THE INVENTION

This invention relates to manual dispensing devices for dry granular materials such as seeds, fertilizers and the like.

Manual or hand seeders have long been known as exemplified in U.S. Pat. Nos. 1,347,249, 4,760,807 and 4,934,288, for example, and in their present form include features designed to first form a hole or depression in the ground into which the seeds are then deposited by some form of mechanical action that requires one or more such components as springs, rotating plates, cams and the like which are subject to wear and clogging, require maintenance and repair and thus add to the costs of manufacture and an ultimate higher cost for the purchaser.

In view of the above observations, it is one of the important objects of this invention to provide a manual dispenser for dry granular materials that includes a novel means for dispensing such materials requiring only one moving gravity operated part that permits simplicity in construction, economy in manufacture for reduced costs to the purchaser and is maintenance free in operation.

Another object herein is to provide a device of the above class that is efficiently usable from a standing position and thus eliminates the discomfort usually attendant with repeated bending and stooping in the distribution of the materials involved.

Still another object is to provide a device as characterized with which a user can deliver granular materials such as dry sand, limestone, seeds, dry fertilizer, herbicides, pesticides and the like either individually or in predetermined controlled mixtures to a precise selected target point or along a linear path in an effective and efficient manner.

SUMMARY

In accordance with the present invention, a hopper is operably connected for material flow communication to one end of an elongated tube that has its other end closed and includes a laterally oriented material exit opening near the bottom thereof. A weighted, freely movable, closure or valve includes an elongated shank with a concentrically enlarged head disposed within the hopper so that the shank depends into the tube and the head normally closes flow communication between the hopper and the tube. A removable cap is provided for the hopper.

The forceful manual movement of the tube in a vertical plane to a sudden stop effects the movement of the closure to establish flow communication between the hopper and the tube for a limited time interval after which interval, the closure is returned to its original position by gravity. During such interval, material from the hopper will flow by gravity into the tube for passage out of the exit opening to be deposited at any selected point or along a linear path by manipulation of the tube. This procedure can be repeated as often as needed and can be done in different ways such as by sharply bouncing the closed bottom of the tube against a hard surface to produce a recoil action on the closure or by momentum caused by sharply moving the tube upwardly to a sudden stop or by inertia caused by sharply moving the tube downwardly to a sudden stop without striking the ground, or by a combination of the momentum and inertia procedures.

The foregoing objects and such further objects as may appear herein, or be hereinafter pointed out, together with the advantages of this invention will be more fully discussed and developed in the more detailed description of the accompanying drawings.

BRIEF DESCRIPTION OF THE DRAWINGS

FIG. 1 is a perspective view showing my new dispenser for granular materials ready for use, FIG. 2 is an enlarged exploded perspective view of the device in FIG. 1 to show the several parts thereof.

DESCRIPTION OF THE PREFERRED EMBODIMENTS

Figure 3:
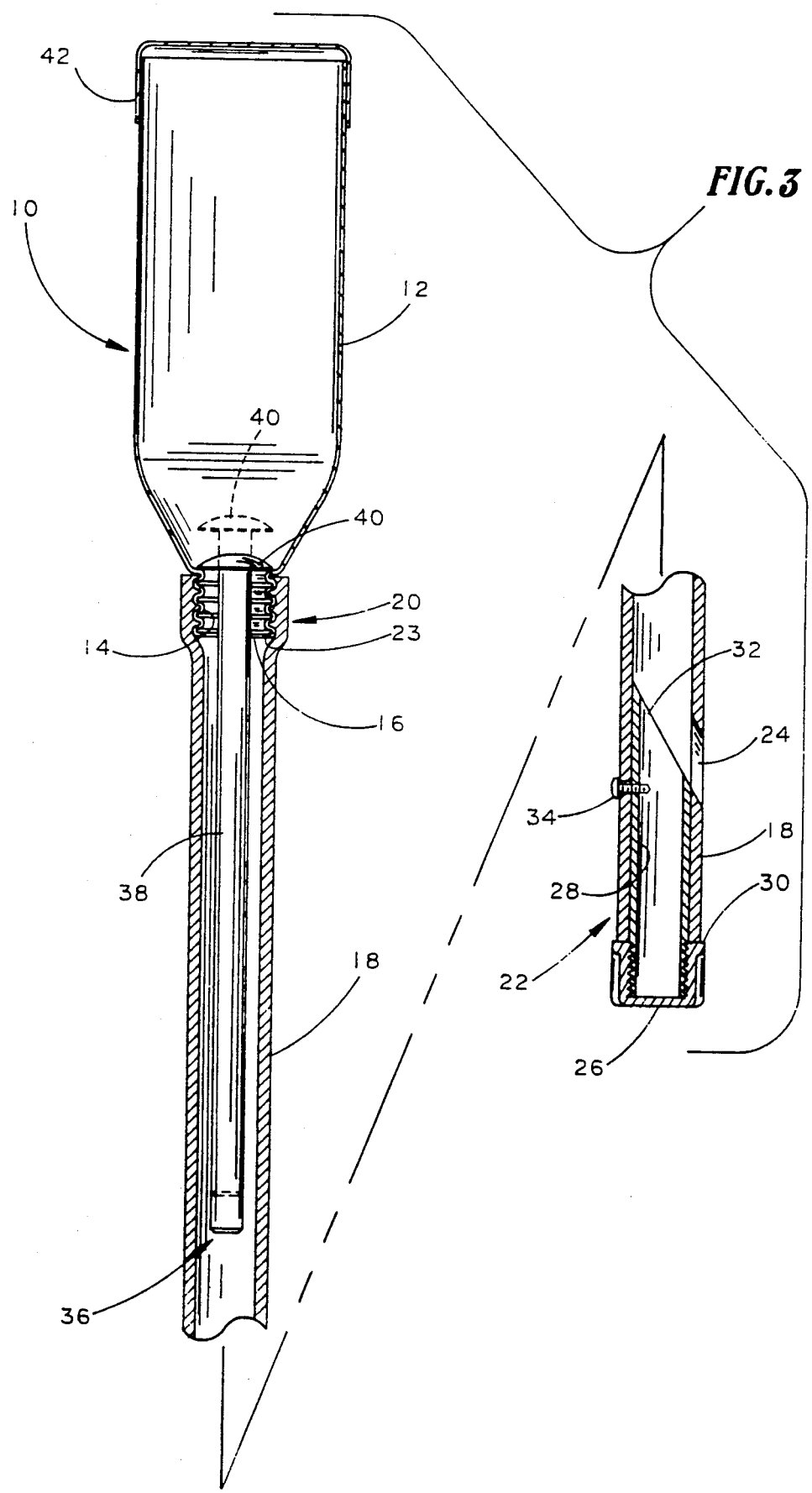
FIG. 3 is an enlarged view of the device in FIG. 1 with portions in section to more clearly indicate the construction thereof.

Referring to the drawings, this new dispenser is designated generally by the numeral 10 as best seen in FIG. 1. A hopper 12 terminates at the bottom in an externally threaded neck 14 providing a discharge opening 16 having a preferred diameter of approximately one inch although this is not required. An elongated tube 18 of any suitable material such as plastic tubing and the like with a preferred inside diameter of one inch has a top end 20 and a bottom end 22 with the top end 20 internally threaded 23 to removably receive neck 14 of hopper 12. Tube 18 may be of any desired length for which I have used approximately five feet and approximately four inches up from the bottom end 22 there is provided a material exit opening or hole 24 which preferably has a diameter of three quarters of an inch and which is on a forty five degree angle upward bevel as best seen in FIG. 3.

A bottom closure cap 26 is threaded to a short plug or pipe 28 of lesser diameter than the cap 26 to provide the flange surface 30 on such cap and plug 28 is removably inserted into the bottom end 22 in a snug friction fit whereby the flange surface 30 is seated against the bottom edge of tube 18 (FIG. 3). The free end of plug 28 is tapered 32 and plug 28 is secured to tube 18 by a set screw 34 so that taper 32 is oriented for directing material flowing down tube 18 to the exit hole 24.

A valve 36 comprises an elongated shank 38 with a concentrically enlarged rounded valve head 40 and is mounted (FIG. 3) so that shank 38 depends into the top of tube 18 and the valve head 40 is seated in the neck opening 16 to provide a closure between hopper 12 and tube 18. It is recommended, but not required, that shank 38 be approximately nine inches long with a three quarter inch diameter to provide adequate weight for purposes to be later described. A removable cap 42 is provided for the top of hopper 12 not only to contain any contents therein when in use but also to keep such contents dry in the event that device 10 is exposed to inclement weather.

OPERATION

The material or materials (not shown) or any combination of the same as may be desired for dispensing is provided to hopper 12 and it is recommended and advised for best results in dispensing such materials that a supply of dry sand always be included with such materials and that, preferably, such dry sand should be cleaned by screening. The use of dry sand not only serves as a vehicle for effectively moving the material but also provides a protective cover for the seeds dispensed whereby such seeds can be planted directly on the ground surface even if the ground is frozen and will be adequately covered while awaiting germination in the natural course of events.

With material in hopper 12 and cap 42 in place, the user, by grasping the tube and imparting a forceful movement thereof in a vertical plane to a sudden stop, will effect the elevation of the freely movable valve head 40 to the dotted line position shown in FIG. 3 for a short time interval after which valve head 40 is moved by gravity to its original position and such movement is facilitated by the weight of shank 38 and its position in tube 18. During such time interval, material will flow by gravity from hopper 12 into tube 18 for passage out of the exit opening 24 and can be deposited at any selected point or along a linear path by manipulation of tube 18. This procedure can be repeated as often as needed and can be done in different ways such by sharply bouncing the bottom cap 26 against a hard surface to produce a recoil action on the valve head 40 or by momentum caused by sharply moving tube 18 upwardly to a sudden stop or by inertia caused by sharply moving said tube downwardly to a sudden stop without striking the ground, or by a combination of the momentum and inertia procedures. If the valve head 40 is elevated by bouncing cap 26 against a hard surface, the shock of the blow is absorbed by the cap and plug 28 which, together with the arrangement of flange 30 relative to tube 18, minimizes any damage to such tube.

Material released into tube 18 will form a natural bevelled surface at the bottom thereof oriented towards the opening 24 and this is enhanced by the bevel 32 on plug 28 for directing the flow of material out of such opening.

It will be noted that the use of device 10 does not require forming holes or depressions in the ground so that in the dispensing of material, such device is not inserted into the ground and thus does not accumulate soil and dirt which must be periodically cleaned away. Device 10 will have ground contact only momentarily if it is actuated by bouncing cap 26 as described and such method of actuation will obviously be used only when the ground surface is firm. If the ground is soft and possibly damp, one of the other methods of actuation described can be used that does not require ground contact. A further advantage with device 10 is that if valve 36, which is a freely movable unattached component, is misplaced or lost, it can be replaced by an ordinary round headed bolt or a carriage bolt so that the user is not required to obtain any specially design replacement part and such a bolt will operate satisfactorily in the manner described for valve 36. In addition, aside from use of device 10 for the planting of seeds or the like, it can be used to advantage, when supplied only with dry sand, to easily and quickly deliver a supply of such sand to a vehicle tire mired in the snow or mud and it has been found to have the further advantageous use for golf course green keepers in seeding divot holes.

Accordingly, in view of the foregoing, it is thought a full understanding of the construction and operation of this invention will be had and the advantages of the same will be appreciated.

I claim:

1. A device for manually dispensing dry granular materials such as seeds and fertilizers, comprising:
   a hopper,
   an elongated tube having a top end removably secured to said hopper for material flow communication therebetween, and depending therefrom to a closed bottom end,
   said tube being provided with a material exit opening near said bottom end,
   a freely movable weighted closure consisting of a single valve head with an integral elongated depending shank, with said valve head seated in said hopper to normally close flow communication with said tube,
   said tube adapted for forceful manual movement for a limited distance to a sudden stop effecting the momentary moving of said closure out of closure position to provide a limited time interval of communication between said hopper and said tube whereby a controlled amount of any material in said hopper will be discharged into said tube by gravity and flow by gravity in said tube through said exit opening, and
   said closure being returned by gravity to closure position after said time interval.

2. A device as defined in claim 1, wherein:
   said valve head disposed intermediate said hopper and said top end to serve as said closure, and
   said shank depending from said valve head into said tube.

3. A device as defined in claim 1 including a removable cap for said hopper.

4. A device as defined in claim 1 wherein said exit opening is on a forty five degree upward bevel.

5. A device as defined in claim 1 wherein said closed bottom end includes:
   a plug removably disposed in the bottom of said tube,
   a cap removably attached to said plug and in abutting engagement with the bottom of said tube, and
   said plug being provided with a tapered top surface juxtaposed to said exit opening to facilitate the deflection of material flowing down said tube to said exit opening.

6. A device as defined in claim 1 wherein said forceful manual movement is in a downwardly direction against a hard surface to produce a recoil action against said closure for moving it out of closure position.

7. A device as defined in claim 1 wherein said forceful manual movement is in an upwardly direction to a sudden stop to elevate said closure by momentum.

8. A device as defined in claim 1 wherein said forceful manual movement is in a downwardly direction to a sudden stop free of contact with any external object to elevate said closure by inertia.

9. A device for manually dispensing dry granular materials such as seeds and fertilizers, comprising:
   a hopper for holding a supply of dry granular material,
   an elongated tube operably connected at a top end to said hopper in material flow communication therewith,
   said tube having a closed bottom end and a lateral exit opening near said bottom end,
   a freely movable weighted closure consisting of a single valve head with an integral elongated depending shank, with said valve head seated in said hopper to normally close flow communication with said tube, and said shank depending into said tube, a plug removably disposed in the bottom of said tube, said plug being provided with a tapered top surface juxtaposed to said exit opening to facilitate the deflection of material flowing down said tube to said exit opening, said tube adapted for forceful manual movement in a vertical plane to a sudden stop effecting the movement of said closure to unseat it for a limited time interval to establish material flow communication between said hopper and said tube so during said time interval material from said hopper can flow by gravity into said tube for passage out of said exit opening, and said closure being moved by gravity after said time interval to close flow communication between said hopper and said tube.

10. A device as defined in claim 9 wherein said closure is an ordinary round headed bolt.

11. A device for manually dispensing dry granular materials such as seeds and fertilizers, comprising:

a hopper, an elongated tube having a top end removably secured to said hopper for material flow communication therebetween, and depending therefrom to a closed bottom end, said tube being provided with a material exit opening near said bottom end, a freely movable closure in said hopper normally in a closure position relative to material flow communication with said tube, a plug removably disposed in the bottom of said tube, a cap removably attached to said plug and in abutting engagement with the bottom of said tube, said plug being provided with a tapered top surface juxtaposed to said exit opening to facilitate the deflection of material flowing down said tube to said exit opening, said tube adapted for forceful manual movement in a vertical plane for a limited distance to a sudden stop effecting the momentary moving of said closure out of closure position to provide a limited time interval of communication between said hopper and said tube whereby a controlled amount of any material in said hopper will be discharged into said tube by gravity and flow by gravity in said tube through said exit opening, and said closure being returned by gravity to closure position after said time interval.

12. A device as defined in claim 11, including:

said closure consisting of a single valve head and an elongated shank depending therefrom, said valve head disposed intermediate said hopper and said top end to serve as said closure, and said shank depending from said valve head into said tube.

13. A device as defined in claim 11 wherein said forceful manual movement is in a downwardly direction against a hard surface to produce a recoil action against said closure for moving it out of closure position.

14. A device as defined in claim 11 wherein said forceful manual movement is in an upwardly direction to a sudden stop to elevate said closure by momentum.

15. A device as defined in claim 11 wherein said forceful manual movement is in a downwardly direction to a sudden stop free of contact with any external object to elevate said closure by inertia.

* * * * *